United States Patent [19]

Chesnut et al.

[11] 4,343,411

[45] Aug. 10, 1982

[54] ELECTRICAL BOX COVER

[76] Inventors: Ronald D. Chesnut, 5230 Mason La.; James M. Tepper, P.O. Box 2093, Oretech Branch, both of Klamath Falls, Oreg. 97601

[21] Appl. No.: 239,369

[22] Filed: Mar. 2, 1981

[51] Int. Cl.³ .............................................. H02G 3/14
[52] U.S. Cl. .................................... 220/242; 220/3.8; 174/67
[58] Field of Search ................. 220/3.8, 241, 242, 3.7, 220/3.3; 174/48, 57, 67, 53, 66; 339/44 R, 44 A

[56] References Cited

U.S. PATENT DOCUMENTS

| | | | |
|---|---|---|---|
| 2,996,566 | 8/1961 | Stas | 220/3.7 |
| 3,137,763 | 6/1964 | Jones | 220/241 |
| 3,956,573 | 5/1976 | Myers et al. | 174/48 |
| 3,987,928 | 10/1976 | Mori | 220/242 X |
| 4,163,137 | 7/1979 | Close, Jr. | 220/242 X |

*Primary Examiner*—George T. Hall
*Attorney, Agent, or Firm*—Klarquist, Sparkman, Campbell, Leigh, Whinston & Dellett

[57] ABSTRACT

An electrical box cover for an outside electrical receptacle and box includes a generally flat, circular cover plate having a beveled rim and a flat, circular gasket. The cover plate and gasket have five corresponding linearly-aligned holes, including a center hole and two pairs of diametrically-opposed holes. The circular shape of the cover plate and gasket and the spacing of the holes enables the box cover to be used with several different types of outside electrical boxes, including cylindrical, single gang and double gang type electrical boxes. The cover plate additionally has two access openings for receiving a standard duplex electrical receptacle and two spring-activated snap lid doors for covering the openings and protecting the receptacle from outside elements.

5 Claims, 3 Drawing Figures

U.S. Patent    Aug. 10, 1982    4,343,411
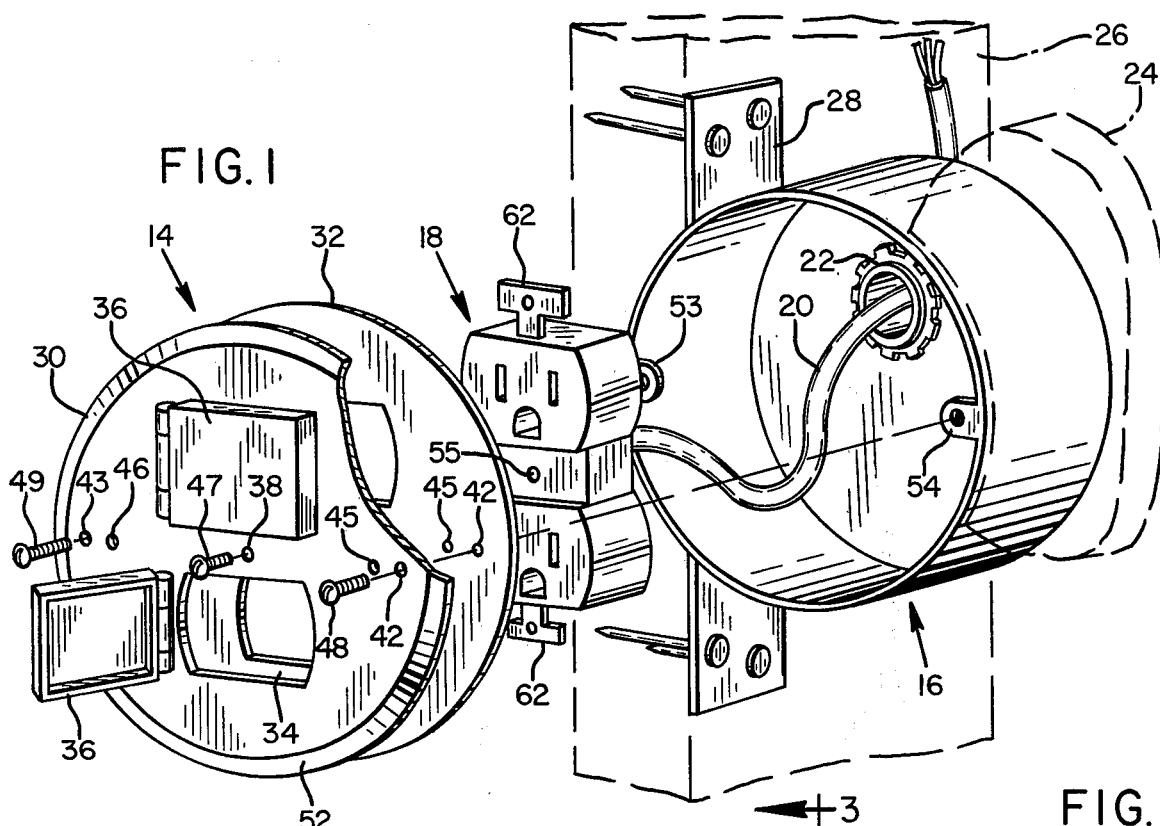
FIG. 1
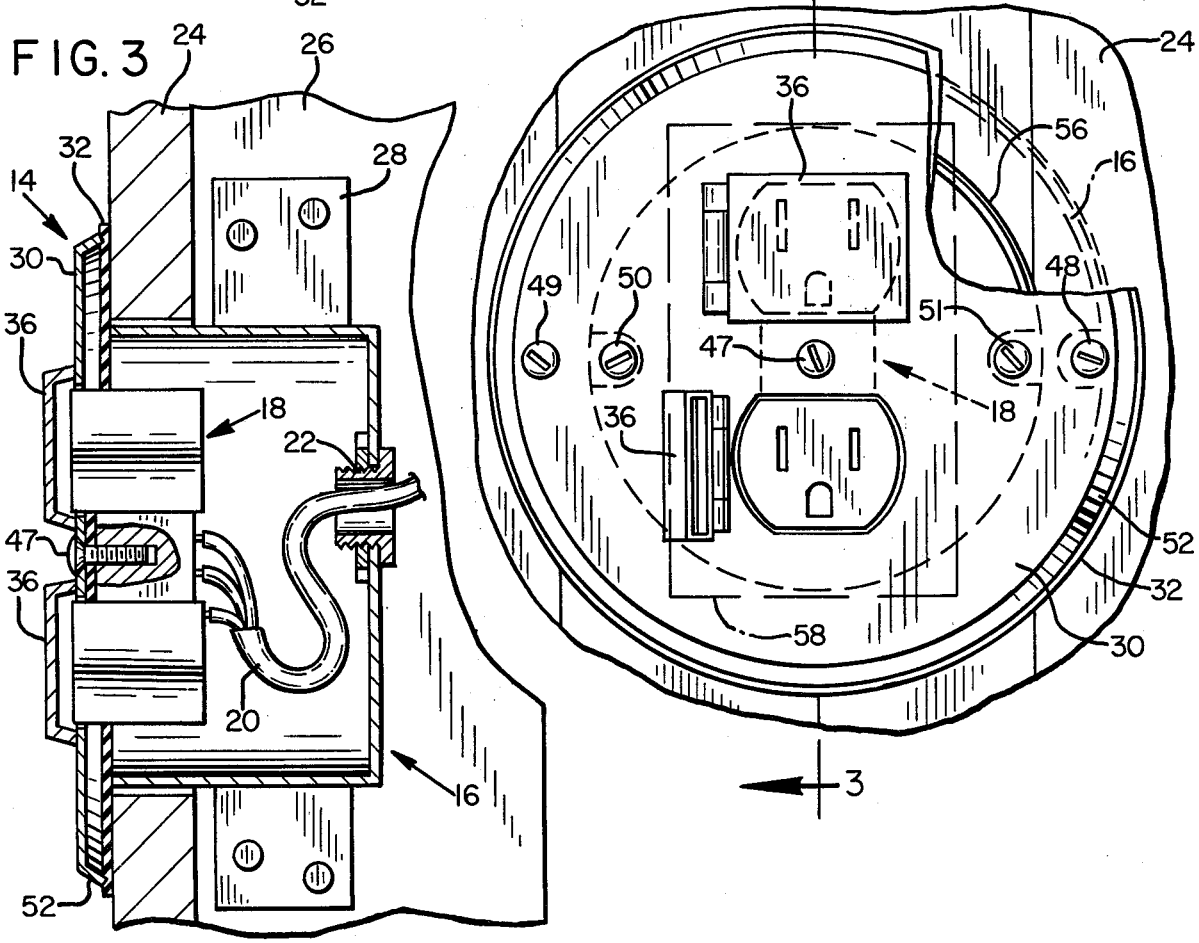
FIG. 2
FIG. 3

ELECTRICAL BOX COVER

BACKGROUND OF THE INVENTION

1. Field of the Invention

The present invention relates to electrical box covers and more particularly to electrical box covers which cover outside electrical boxes.

2. Description of the Prior Art

All outside electrical boxes need a box cover which provides a weatherproof seal and protects the electrical elements carried within the box from grit, moisture and other elements, and also provides access to the electrical receptacle. While many prior art box covers successfully accomplish these objectives, they are time-consuming and expensive to install and are not structurally stable. They also tend to be of a rather complex construction and expensive to manufacture. Moreover, prior art box covers are designed to fit only specially-designed electrical boxes.

Most prior art electrical box covers which are used with outside electrical boxes are rectangular in shape and require complementary-shaped rectangular boxes. These boxes are most commonly of a single gang or double gang type. Typically, with the original electrical wiring already in place, the outer surface layers of the building or house, most typically wood sheathing and siding, are fastened to the wall studs. The electrical box and box cover are then installed by first determining the general location of the lead wires behind the outer wall material and then cutting away a section of the wall material corresponding to the perimeter of the box. With a rectangular or square electrical box, this involves accurately measuring and etching four lines on the outer wall surface and then using a keyhole saw, jigsaw or the like to cut out the section. This is time consuming and, therefore, expensive. Moreover, even with accurate measurement, the cutting process itself can be inaccurate. If the section is cut too small, the box will not fit and additional cutting will be necessary. And if the section is cut too large, the box cover may not overlap the excess portion cut away, leaving an unattractive gap in the siding. The use of a keyhole saw jigsaw also frequently results in unattractive overcuts which are still visible once the box and box cover are installed. Moreover, most keyhole saws and jigsaws have braces which rest on the surface of the siding to minimize vibration and, as a result, tend to mar or gouge the surface of the siding during the cutting.

Electrical boxes and box covers of this type are also not structurally stable since the box cover is normally secured to the electrical receptacle mounted within the box by a single screw. The cover is thus capable of rotating relative to the box if the screw becomes loose.

A few of these problems are overcome by the Stas U.S. Pat. No. 2,996,566, and Meyers U.S. Pat. No. 3,956,573, both of which disclose round electrical boxes and box covers. The Stas box cover is used with a floor-type outlet box and has a resilient gasket which provides a watertight seal between the box cover and box. However, one of the problems with the Stas cover is that it can only be used with an electrical box which is specially designed to accommodate it. The cover will only fit a box that has a complementary-shaped annular recess and shoulder. Moreover, since the box cover is mounted flush with the floor surface and has a seal disposed below such surface, water can seep through the crack surrounding the cover and collect above the seal. Additionally, the cover appears to be time-consuming to install and expensive to manufacture, since it requires a supporting gasket, brass plate, fiber washer and annular shoulder.

The Myers box cover not only provides a watertight seal between the box cover and box, it retains the electrical receptacle as well. It is much easier to install than the Stas box cover since it is threaded and can be screwed into the electrical box. However, it is also expensive to manufacture and can only be used with a specially-designed electrical box. Furthermore, its construction is rather complicated and involves the assembly of some eight components.

Accordingly, there is a need for a box cover which can be easily and quickly installed, is structurally stable and can be used with round and rectangular electrical boxes of different sizes.

SUMMARY OF THE INVENTION

The present invention fulfills the foregoing needs in that it comprises a round, universal electrical box cover which can be applied to round or rectangular electrical boxes of different sizes. The cover's round shape also simplifies installation of the box, since a hole saw can be used to cut a perfectly round, neat hole in the wall after determining only the center point for the box.

The circular cover plate of the invention includes a mating gasket with a series of five holes spaced along a diameter and extending through both. The series of holes include a center hole and a pair of holes offset on each of the opposite sides of the center hole. The cover plate and gasket also each have access openings for receiving a standard duplex electrical receptacle. When the cover plate and gasket are mounted on the electrical box, the gasket is disposed between the cover plate and box to provide a weatherproof seal therebetween. The cover plate and gasket can be mounted on most single and double gang boxes by using the center hole and on round boxes by using either the innermost or the outermost holes of the pairs.

It is therefore one object of the invention to provide an improved outside electrical box cover that will fit conventional rectangular and round electrical boxes of different standard sizes.

Another object of the invention is to provide an improved electrical box cover which can be quickly and easily installed.

A further object is to provide a box cover of simplified low-cost construction which is structurally stable when mounted on the electrical box.

An additional object is to provide a box cover which can be installed with a minimum of marring or scratching of a wall surface.

Other objects and advantages of the invention will become apparent from the following detailed description and with reference to the accompanying drawings.

BRIEF DESCRIPTION OF THE DRAWINGS

In the drawings:

FIG. 1 is an exploded, perspective view of an electrical box cover and box in accordance with the present invention;

FIG. 2 is a front view of the box cover and box of FIG. 1, in an assembled condition, with a portion of the box cover cut away;

FIG. 3 is a sectional view taken along line 3—3 of FIG. 2.

DETAILED DESCRIPTION OF A PREFERRED EMBODIMENT

As shown in FIG. 1, a circular electrical box cover 14 provides a weatherproof cover for a conventional circular electrical box 16, and access to a standard duplex receptacle 18.

The electrical box 16 has the usual opening in its rear wall for allowing a conductor 20 to pass through and connect with receptacle 18. A clamp 22 threaded into the rear box opening secures the conductor 20 to the box. The box is maintained in a substantially rigid position with its front rim in flush alignment with an outside wall 24 by nailing a nailing bracket portion 28 of the box to a wall stud 29. The nailing bracket is normally affixed to the box by welding.

The box cover 14 includes a generally flat, circular cover plate 30 and a flat, circular gasket 32 which has a diameter slightly greater than that of the cover plate. The cover plate 30 and gasket 32 each have two corresponding access openings 34, one of which is shown in FIG. 1, for receiving receptacle 18. The cover plate has two spring-loaded, snap lids 36 for covering openings 34 and protecting the receptacle from moisture and other elements. Both the cover plate and gasket also have five corresponding linearly-aligned holes spaced across a diameter of each. While FIG. 1 does not show all five holes on the gasket, the cover plate and gasket each have a center hole 38, a pair of diametrically-opposed, outermost holes 42, 43, and a pair of diametrically-opposed innermost holes 45, 46. The innermost holes and the outermost holes are each equidistant from the center hole. The holes receive screws 47, 48, 49, as shown in FIGS. 1 and 2, or screws 50, 51, as shown in FIG. 2. The corresponding holes on the gasket and cover plate are in registry to receive a common screw when the gasket and cover plate are placed in a concentric position on box 16. The cover plate additionally has a beveled rim 52 which is angled backwardly towards gasket 32.

FIG. 3 shows the box cover 14 in a sealed and secured position on box 18. The cover plate 30 and gasket 32 are secured firmly against wall 24 and the outside rim of box 16 by inserting screws 48, 49 through outermost holes 42, 43 of the cover plate and the corresponding holes (hidden) of the gasket, and threading the screws into a pair of mounting ears 53, 54 on box 16, as shown in FIG. 1. Optionally, the center portion of the cover plate and gasket can be rigidly secured to receptacle 18 by screw 47, using center hole 38 and a threaded hole 55 on receptacle 18.

The cover plate can be of any weather-resistant material structurally strong enough to withstand pressure applied to its center by screw 47 or to its periphery by screws 48 and 49. The gasket can be of any resilient waterproof material strong enough to allow the rim 50 of the cover plate to bite into its outer surface without tearing.

APPLICATION AND INSTALLATION

The box cover has a wide application and can be used with round and rectangular electrical boxes of different sizes. It is especially suited for use with round, cylindrical-type electrical boxes, such as the box 16 of FIG. 1. Broken line 16 in FIG. 2 represents the box of FIG. 1. By using innermost holes 45, 46 instead of outermost holes 42, 43 and screws 50, 51, the box cover can also be mounted on a round box having a smaller diameter than box 16, such as the box 56 shown in FIG. 2. The box cover is maintained in a structurally stabl position, whether mounted to box 16 or box 56 by the two diametrically-opposed screws. The box cover is thus not capable of rotating relative to the box. Further, screw 47 and center hole 38 can be used to mount the receptable 14 to the box cover.

The present invention can also be used to cover rectangular, single gang and double gang electrical boxes which have a length and width that is less than the diameter of the box cover. A single gang box 58 is shown in FIG. 2. A double gang box simply has a greater width dimension. With most single and double gang boxes, the electrical receptacle 18 is mounted directly to the box, rather than the box cover, by using two screws and a pair of ears 62 on the opposite ends of the receptacle. Because most, if not all, standard single and double gang boxes do not have mounting ears similar to ears 53 and 54, the box cover 14 is mounted to the receptacle, instead of the box, by using screw 47, center hole 38 and threaded hole 55. A pair of wood or metal screws can optionally be screwed into the wall 24 through either the outermost holes 42, 43 or innermost holes 45, 46 to provide greater structural stability.

The box cover not only has a wide application, it can be quickly and easily installed. The box cover is installed simply by first determining the desired center point of the box cover on the wall and cutting a round hole with a hole saw. The hole need not be accurately sized. It is only necessary that it be larger than the box, whether round or rectangular, and smaller than the box cover. Then, after the electrical box is secured to the wall stud and the recptacle is mounted to either the box or box cover, the box cover is fastened to the box by, at most, two screws. It is not necessary to cut out a rectangular section with a jigsaw or other special saw by accurately measuring, etching and cutting four straight lines. There are also no visible overcuts or gaps in the siding surface after the box cover is installed. Nor is the surrounding surface marred or scratched.

It will be understood that the spacing of the innermost and outermost holes from center hole 38 and the diameter of the cover plate and gasket will be determined indirectly by the diameter of the box, in the case of a round box, and directly by the spacing of mounting ears 53, 54.

It is also important to emphasize that cover plate 30 and gasket 32 can be made of any size, although a size which is too large or small may be impractical. Depending on the size of the cover plate and gasket, any number of linearly-aligned, diametrically-opposed pairs of holes can be provided to accommodate round electrical boxes of varying diameters. It should also be emphasized that the cover plate and gasket can have any number of variously shaped and oriented access openings 34 to accommodate various types of electrical receptacles.

Having illustrated and described the principles of our invention by what is presently a preferred embodiment and several suggested alternatives, it should be apparent to those persons skilled in the art that such embodiments may be modified in arrangement and detail without departing from such principles. We claim as our invention all such modifications as come within the true spirit and scope of the invention as defined by the following claims.

We claim:

1. An electric box cover for covering an electrical receptacle and outlet box comprising:

a circular cover plate having one or more access openings to provide access to one or more corresponding electrical receptacles, a circular gasket with a diameter at least slightly greater than that of said cover plate, said gasket having one or more openings which are in alignment with the openings of said cover plate when the two are fitted together in concentric relationship, said cover plate including universal means for enabling said box cover to be used with several types of outlet boxes.

2. A box cover according to claim 1 wherein the universal means includes:

means defining five linearly-aligned plate holes spaced apart along a diameter of said cover plate, including a center hole for connecting the cover plate to an electrical receptacle, a first pair of diametrically-opposed outermost holes for connecting the cover plate to a wall structure in an overlying relationship to a rectangular outlet box, and a second pair of diametrically-opposed holes inwardly of said first pair for connecting the cover plate to a round outlet box, and means defining five linearly aligned gasket holes spaced along a diameter of said gasket in positions corresponding to the positions of said plate holes in said plate such that the cover plate and gasket can be fitted together in a concentric relationship with said gasket holes aligned with said plate holes.

3. A box cover according to claim 2 wherein said cover plate includes front and back faces and has an annular rim which is angled backwardly and outwardly toward said gasket to provide an airspace between said cover plate and gasket when the two are fitted together in a concentric relationship.

4. A box cover according to claim 3 wherein the free edge of said rim engages said gasket to provide a sealed airspace.

5. A box cover according to claim 4 wherein said access openings include one or more snap lid doors for protecting said electrical receptacles from the elements when not in use.

* * * * *